United States Patent

Byles

[11] 4,124,279
[45] Nov. 7, 1978

[54] REFLECTOR FOCUSED LIGHT TRAP FOR A LIQUID CRYSTAL DISPLAY

[75] Inventor: William R. Byles, Los Angeles, Calif.

[73] Assignee: Hughes Aircraft Company, Culver City, Calif.

[21] Appl. No.: 816,249

[22] Filed: Jul. 18, 1977

[51] Int. Cl.$^2$ ............................................. G02F 1/13
[52] U.S. Cl. ................................. 350/345; 350/338
[58] Field of Search ............... 350/345, 338, 334, 331

[56] References Cited

U.S. PATENT DOCUMENTS

| | | | |
|---|---|---|---|
| 3,728,007 | 4/1973 | Myrenne et al. | 350/338 |
| 3,768,887 | 10/1973 | Portmann | 350/345 |
| 3,920,311 | 11/1975 | Tsuda et al. | 350/345 X |
| 3,957,351 | 5/1976 | Stockwell | 350/345 |
| 4,068,924 | 1/1978 | Kotani | 350/345 |

*Primary Examiner*—Edward S. Bauer
*Attorney, Agent, or Firm*—Donald C. Keaveney; W. H. MacAllister

[57] ABSTRACT

There is disclosed a liquid crystal display device which utilizes an elliptical mirror to present a magnified image of a light trap across the surface of a liquid crystal display element which is positioned with respect to the mirror and the light trap so as to simultaneously receive both ambient and auxiliary illumination on the surface of the display element from the mirror at angles where liquid crystal scattering is most effective. The auxiliary light source may be positioned adjacent to the light trap. The display element is positioned such that the viewing angle for the observer is below the horizontal line from the observer to the plane of the display element. The light trap and auxiliary light source are slightly above the display element whereas the elliptical mirror is below and in front of the display element positioned so as to place the light trap at one focus of the ellipse of which the mirror surface forms a segment and to position the mirror image of the observer reflected from the display element at the other focus of the ellipse.

8 Claims, 3 Drawing Figures

REFLECTOR FOCUSED LIGHT TRAP FOR A LIQUID CRYSTAL DISPLAY

PRIOR ART AND BACKGROUND OF THE INVENTION

Liquid crystal display panels are increasingly used for the general display of alpha-numeric information and in particular they are finding application to such areas as control panels in the cockpit of aircraft or the like where the pilot user may view the display by looking down at an angle from the horizontal.

An inherent problem encountered with reflective dynamic scattering liquid crystal displays used in such applications is that of light trapping the specular reflection off of the display surface while providing illumination at angles where liquid crystal scattering is efficient.

Efforts of the prior art to use reflective surfaces to provide light to liquid crystal and other display devices are typified by the following U.S. Pat. Nos. 3,728,007 to Myrenne et al; 3,838,909 to Fitzgibbons; 3,920,311 to Tsuda; and 3,924,932 to Yamamoto. None of these discusses or solves the above problem dealt with by the present invention.

It is an object of this invention to provide a reflective dynamic scattering liquid crystal display and mounting arrangement therefore which solves this light trapping problem and is suitable for such cockpit use.

SUMMARY OF THE INVENTION

The liquid crystal display arrangement described herein utilizes an elliptical mirror to present a magnified image of a light trap across the display surface. The elliptical mirror at the same time reflects both ambient and auxiliary illumination onto the surface of the display element at angles where liquid crystal scattering is most effective. Preferably the light trap is positioned at one focus of the ellipse of which the elliptical mirror forms a segment. The mirror is below the light trap and the display element is back of both the mirror and light trap with respect to the observer. A fluorescent or other convenient light source may be positioned between the light trap and the display element. All of the components may be mounted in a suitable housing for positioning in a control panel or other area of use.

The arrangement has numerous advantages over heretofor known devices. The illumination angles are nearly ideal for liquid crystal displays. The elliptical mirror collects ambient light from above and reflects it onto the display. The light trap is small and does not block off much ambient light. Auxiliary or night illumination is gathered by the mirror and focused uniformly onto the display. The mechanical configuration of components is simple and compact with no protruding light sources or traps.

BRIEF DESCRIPTION OF THE DRAWINGS

These and other features, objects and advantages will be more fully apparent from the following detailed description of the invention taken in conjunction with the accompanying drawings wherein like reference characters refer to like parts throughout and in which.

DETAILED DESCRIPTION OF THE DRAWINGS

Figure 1:
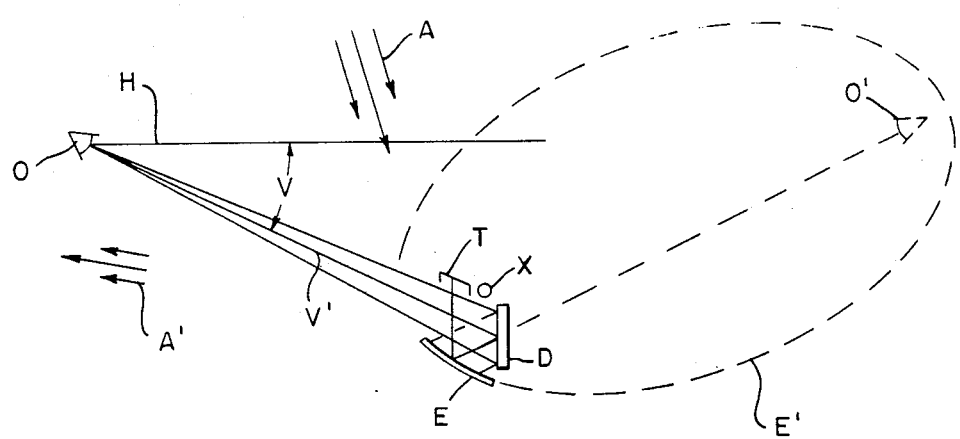
FIG. 1 is a diagrammatic view illustrating the relationship of the various optical components to the ellipse of which the elliptical mirror forms a segment.

As with most reflective liquid crystal displays, the display arrangement of the present invention is viewed at an angle, V. As may be seen in the drawings, the display D is positioned below the horizontal H with respect to the observer, O. The elliptical mirror E is placed below the display and the light trap T is placed above the elliptical mirror E. Both the light trap and the mirror are positioned in front of display D. Auxiliary light source X is positioned between the light trap and the display and above the elliptical mirror. Normal ambient illumination A is intended to be received from above the mirror and in front of the display.

Figure 2:
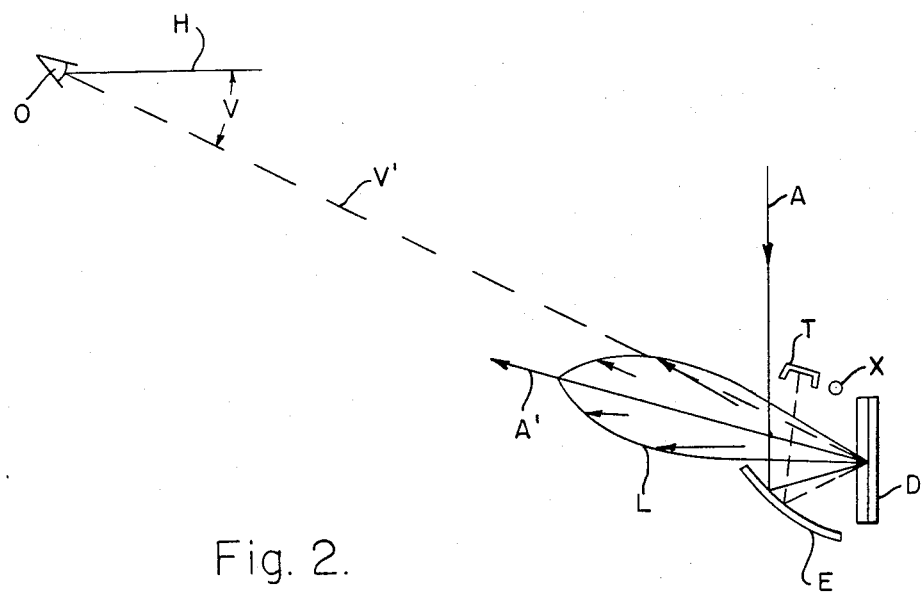
FIG. 2 is a diagrammatic view illustrating various directions of light travel in the display element.

The relationship between the positions of the black velvet or other light trap T, the elliptical mirror E, and the display element D is such that the elliptical mirror presents a magnified image of the light trap T across the surface of display element D sot that the display normally appears dark to the observer O. Furthermore, the light trap T is at one focus of the complete ellipse E' of which the elliptical mirror E forms one segment. The virtual image O' of the observer O considered as if reflected from the display surface D is at the other focus of the ellipse E'. The observer O looks into the display along viewing direction V' and sees the magnified image of the light trap reflected in the elliptical mirror, thereby making the display appear black. Ambient light A coming in from above as shown in FIGS. 1 and 2, will strike the mirror E and be reflected onto the display D. In the off-state of device D, it will again reflect and exit at an angle below the viewing angle V from the observer that is to say, it will exit along the first specular direction A' below viewing direction V' as can be best seen in FIG. 2.

If the liquid crystal in display D is activated to the on-state by applying a signal voltage across it in a manner well known in the art, this light will be scattered or deflected in a lobe, L, around the specular reflection direction axis A' and will be seen by the observer O. Since the liquid crystal is not a good diffuser, most of the scattered light is contained in the proximity of the specular reflection axis A', and it is important that the specular exit angle be close to the viewing angle to maintain good brightness and contrast. This relationship is maintained with the disclosed light trapping arrangement for both ambient and auxiliary lighting.

Figure 3:
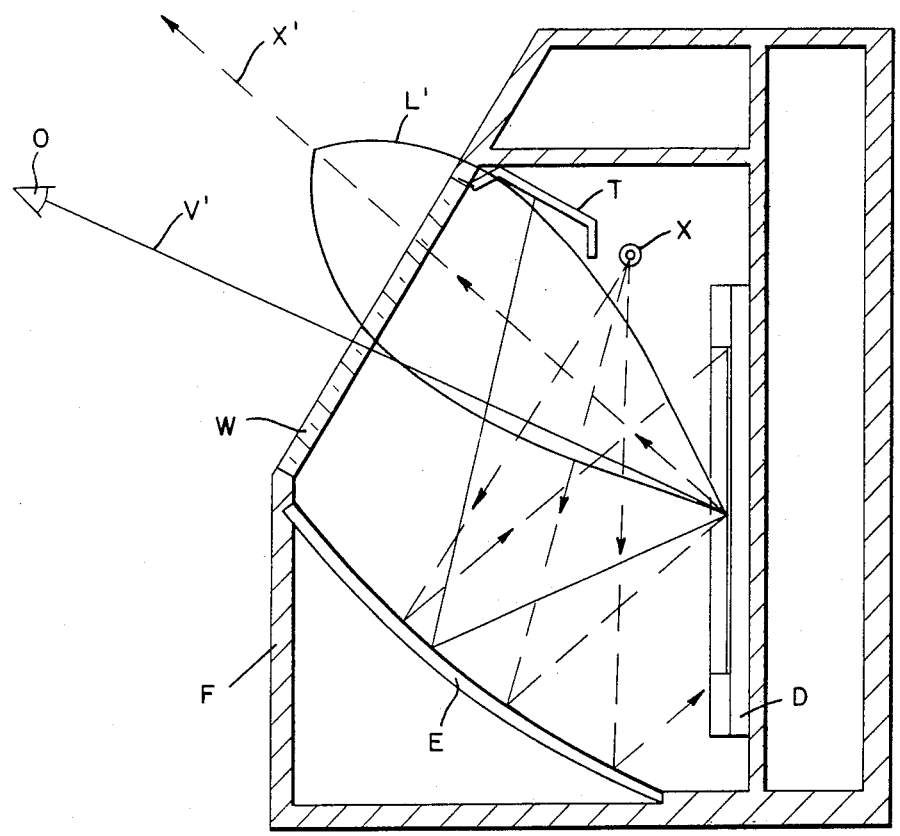
FIG. 3 is a cross-sectional view illustrating one possible mechanical configuration of the element shown in FIGS. 1 and 2.

To provide night lighting and added daytime brightness, the auxiliary light X is added behind the light trap and above the display, as shown in the drawings. Light from this source is collected by the mirror and, as shown in FIG. 3, is reflected onto the display at an angle such that it will exit along second direction X' just above the viewing direction V'. Light scattered by the liquid crystal will again form a lobe, L', in this case centered about the axis X' to provide the observer with good contrast when the observer's line of sight V' intersects lobe L'. Of course, if both ambient light A and auxiliary light X are used, both lobes L and L' will exist and the observer will see from both.

A fluorescent light bulb X is shown in FIG. 3 which is a sectional view of a prototype exemplary embodiment of the invention using for the display element D a 16 segment alpha-numeric liquid crystal reflective display. The elliptical mirror E is fabricated by using a metallized mylar sheet glued to forms of the right curvature. For most applications the ellipse can be approximated by a spherical curvature in order to simplify the fabrication. The light trap T was covered with a black velvet material to provide as black a background as possible for highest display contrast. The size of the light trap is determined by the size of the viewing window W that the observer O will be allowed. In FIG. 3 the viewing window W may be an actual glass window mounted in a metallic or other rigid opaque frame member F which supports all of the elements. In the device shown, the viewing window (which is defined by the space between the upper edge of the elliptical nerve E and the front edge of the light trap T) is such as to permit a ±5° up and down movement of the observer. Larger angular variations are possible if the light trap is made proportionally larger.

The auxiliary light source X used in the exemplary embodiment shown in FIG. 3 consisted of a 4 watt fluorescent tube about 6 inches long, suitably mounted in the frame F. Of course, incandescent lights can also be used. Under normal room lighting, with the auxiliary light off, the display brightness was approximately 7 foot lamberts with a contrast ratio of 15/1. With the auxiliary light on, the brightness was over 100 foot lamberts with contrast ratio of 20/1. In direct sunlight the display was also found to give good contrast under all conditions, including the case where the display was shaded, illuminated only by skylight.

The above-described light trapping arrangement has been found to be quite effective for direct view liquid crystal displays and may suitably be used in aircraft liquid crystal panel displays or the like.

What is claimed is:

1. In combination with a reflective electro-optical display device:
   a. a light trap;
   b. mirror means for simultaneously projecting an image of said light trap onto said device and for supplying light to said device for off-state reflection from said device in a first direction; and
   c. means associated with said display device for selectively deflecting light reflected from said display device away from said first direction and towards a viewing direction in the on-state of said device.

2. An electro-optical display device as in claim 1 wherein:
   a. said display device comprises a reflective dynamic scattering liquid crystal display panel; and
   b. said mirror means comprises means for focusing a magnifield image of said light trap means on the display surface of said display panel and for simultaneously reflecting illuminating light onto said display surface of said display panel at angles at which said liquid crystal dynamic scattering has optimum effectiveness.

3. A device as in claim 1 wherein said mirror means is an elliptical mirror.

4. A device as in claim 3 wherein said light trap is positioned at one focal point of the ellipse defining the elliptical surface of said mirror, said device being designed to position a virtual image of the observer reflected in said display panel at the other focus of said ellipse.

5. A device as in claim 1 wherein said mirror is a shperical mirror approximating the curvature of an elliptical mirror.

6. A device as in claim 1 and further including an auxiliary powered light source, said light supplied to said device by said mirror comprising either ambient light or light from said auxiliary light source.

7. A device as in claim 6 wherein said light trap means and said auxiliary light source are positioned in front of said display panel and above the lobe of light scattered from said liquid crystal display panel and wherein said elliptical mirror means is positioned in front of said display panel and below said lobe.

8. A device as in claim 7 wherein light from said auxiliary light source is reflected from said device in a second direction in the off-state of said device and is deflected to said viewing direction in the on-state of said device, said first direction being below said viewing direction and said viewing direction being below said second direction.

* * * * *